(No Model.)
L. CAPAZZA.
AEROSTATIC PARACHUTE.
No. 496,854. Patented May 9, 1893.
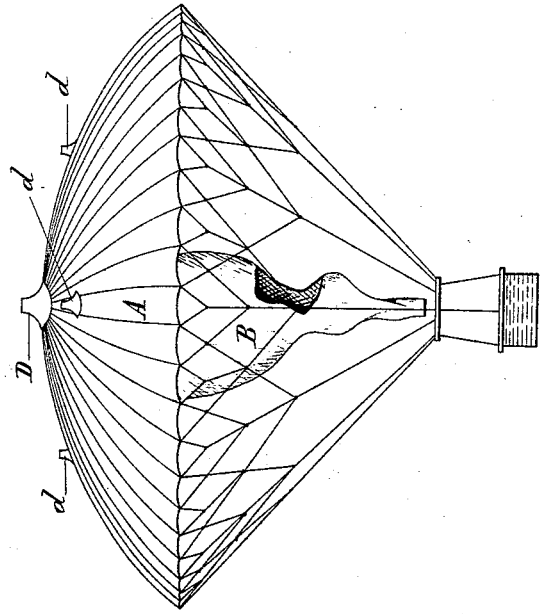
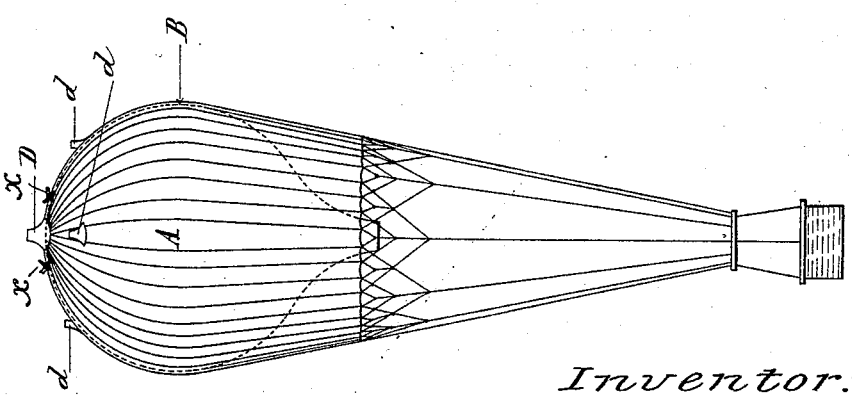
Witnesses
E. B. Bolton
E. K. Sturtevant
Inventor:
Louis Capazza
By 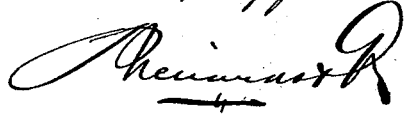
his Attorneys

UNITED STATES PATENT OFFICE.

LOUIS CAPAZZA, OF PARIS, FRANCE.

AEROSTATIC PARACHUTE.

SPECIFICATION forming part of Letters Patent No. 496,854, dated May 9, 1893.

Application filed July 1, 1892. Serial No. 438,671. (No model.) Patented in France August 1, 1891, No. 215,265, and in England February 29, 1892, No. 3,883.

*To all whom it may concern:*

Be it known that I, LOUIS CAPAZZA, a citizen of the French Republic, residing at Paris, France, have invented a new and useful Improvement in Aerostatic Parachutes; and I do declare the following to be a full, clear, and exact description thereof.

The invention has been patented in France, No. 215,265, dated August 1, 1891, and in Great Britain, No. 3,883, dated February 29, 1892.

My invention has for its object an attachment to the balloon adapted to render harmless any fall which would arise from an accident happening to the balloon. Up to this time parachutes have only been employed (with the exception of ballast in the case of my parachute), to protect an aeronaut in case of a voluntary fall made for the amusement of spectators. But if the balloon which supports the parachute happens to break, the said parachute is absolutely of no avail, whatever be its dimensions.

In my invention the parachute cannot expand until the balloon is bursted. This parachute has besides such dimensions that it can always easily support the car, and all the material which it is designed to carry.

My invention consists in covering the balloon proper with a parachute, to the ropes of which is attached directly the hoop which supports the car. This parachute takes accordingly the form represented in the accompanying drawings; in which—

Figure 1 is a side view of the parachute in folded position about the expanded balloon. Fig. 2 shows the parachute extended over the collapsed balloon.

Referring to Fig. 1, A is the parachute closed, covering the balloon B, which is likewise in some way fixed in the pocket formed by the parachute. The dimensions of the parachute are to be calculated according to the known formula, taking account of the total weight of the aeronauts and of the material. If for any reason a fall takes place, the air rushes into the parachute which opens, and takes the form represented in Fig. 2, the balloon B, occupying then some position in the space contained between the parachute, the ropes and the hoop. It requires a rapid fall of the parachute in order to create sufficient upward pressure or resistance to cause the spreading of the parachute and in order that this may be secured it is necessary that the balloon be collapsed. In order to secure a descent without oscillation, the upper opening D, through which the air escapes, has the form of a truncated cone, constituting a vertical cone of stability having a point of support from the column of air. Other openings $d$ of the same shape are distributed for the same purpose over the surface of the parachute, and these will serve to properly direct the descent when there is no tearing of the balloon as a whole, away from the parachute; that is to say, when the central opening D, cannot be employed. Accordingly we have under these conditions, a parachute of large dimensions, perfectly adequate for supporting the car of the balloon, whatever be its weight. It may be easily understood that this arrangement is applicable to aerostats of any form. For protection in the case of falling produced by the burning of the balloon proper, the parachute and also its ropes are covered with a coating rendering them incombustible.

Having thus described the object of my invention and the practical means of attaining it, I claim conformably to the law as my exclusive property—

1. In combination the balloon, the car and the parachute enveloping the balloon and attached to the car, substantially as described.

2. In combination the balloon, the parachute entirely inclosing the balloon and adapted to be expanded by the gases escaping therefrom, the car and the cords extending from the lower edge of the parachute to the car for sustaining the same, substantially as described.

3. In combination the balloon, the car, the parachute inclosing the balloon, the car suspended by cords from the parachute, said parachute having the opening or openings through it, substantially as described.

In witness whereof I have hereunto set my hand in presence of two witnesses.

LOUIS CAPAZZA.

Witnesses:
  ROBT. M. HOOPER,
  JULES FAYOLLET.